United States Patent [19]

Saka

[11] 4,018,462
[45] Apr. 19, 1977

[54] PIPE FITTING
[75] Inventor: Yoshimi Saka, Suzuka, Japan
[73] Assignee: Hitachi Metals, Ltd., Tokyo, Japan
[22] Filed: Oct. 31, 1975
[21] Appl. No.: 627,817
[52] U.S. Cl. .................... 285/111; 29/508; 29/516; 285/382.2; 285/382.7; 285/423
[51] Int. Cl.$^2$ ........................ F16L 13/14
[58] Field of Search ............ 285/382.2, 256, 382, 285/382.1, 260, 259, 423, 111, 113, 382.7; 29/508, 516

[56] References Cited
UNITED STATES PATENTS

| 1,930,194 | 10/1933 | Dillon | 285/382 X |
| 2,314,236 | 3/1943 | Mott | 29/508 X |
| 2,614,304 | 10/1952 | Oetiker | 285/256 X |
| 3,244,441 | 4/1966 | Caudle | 285/382 X |
| 3,376,060 | 4/1968 | Tomioka | 285/382 X |
| 3,378,282 | 4/1968 | Demler | 285/256 X |
| 3,429,587 | 2/1969 | Kish | 285/382.2 X |
| 3,477,750 | 11/1969 | Powell | 285/382 X |
| 3,675,949 | 7/1972 | Dawson | 285/382.2 X |
| 3,874,709 | 4/1975 | MacDonald | 285/423 X |
| 3,915,480 | 10/1975 | Kish et al. | 285/382 X |

FOREIGN PATENTS OR APPLICATIONS
1,359,919  3/1964  France .................. 285/260

OTHER PUBLICATIONS
Japanese Patent Public Disclosure No. 128821/1975, published or disclosed date–Oct. 11, 1975, copy of the reference is in the file of this application and was filed by applicant on Oct. 31, 1975.

Primary Examiner—Thomas F. Callaghan
Attorney, Agent, or Firm—Sughrue, Rothwell, Mion, Zinn & Macpeak

[57] ABSTRACT

A pipe fitting characterized in that a press ring is fitted around the external surface of a pipe made of an elastic material, another pipe to be joined is inserted into said pipe, reducing the diameter of said press ring from outside, and at the same time causing to bulge out a part of said press ring whereby said pipe and the other pipe are pressedly joined.

9 Claims, 9 Drawing Figures

PIPE FITTING

BACKGROUND OF THE INVENTION

The present invention relates to a pipe fitting for joining pipes made of elastic materials such as polyethylene or other plastic material.

Heretofore, various kinds of pipe fittings and methods for joining pipes made of elastic material have been developed. There are, for example; a packing type pipe fitting which presses a packing around the external periphery of a pipe joined to another by a pressing means, with no additional operation on the pipes to be joined; a pipe fitting in which an intrusion ring is made to intrude on the external surface of a pipe by a pressing means in order to prevent the slip out of a pipe in above-mentioned packing type pipe fitting; a method of joining by means of a bonding agent or adhesive; and a method of pipe fitting wherein pipes are joined by pressing a pipe to be joined together with another pipe. However, each of the above pipe fitting or methods has its own drawbacks in, for example, the air tight function of the pipes, maintenance of strength of pipes to be joined, facility at the pipe fitting operation, etc.

Particularly, in the pipe fitting where the pipe is joined by pressing the pipes to be joined, it has been impossible to maintain the initial compressed, deformed state for a long period of time after the pipes are fitted. For this reason, the latter method could not be used for laying gas pipes.

SUMMARY OF THE INVENTION

The first object of the present invention is to provide a pipe fitting wherein pipes made of elastic material such as polyethylene are joined by pressing.

The second object of the present invention is to provide a pipe fitting which can be used safely for joining gas pipes without danger of leakage or slip out of the pipes.

DESCRIPTION OF THE PREFERRED EMBODIMENTS

Figure 1:
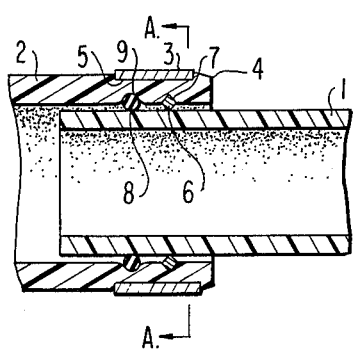
FIG. 1 is a longitudinal sectional view showing the state of a pipe fitting before clamping.

In FIG. 1, wherein the pipes are shown prior to their being joined, an outer pipe 2, made of an elastic material such as polyethylene, polypropylene or the like, has a press ring 3 made of metal, for example, fitted in a holding groove 5 on the outside circumference of pipe 2. The press ring 3 is placed on the pipe through the inclined surface at the outer diameter of the end portion 4 of pipe 2. A holding groove 7 for an intrusion ring and a packing groove 9 are formed on the inner face of pipe 2. An intrusion ring 6 made of metal or hard synthetic resinand a leakproof packing 8 made of such as rubber are inserted in the grooves 7 and 9, respectively, and a pipe 1 made of synthetic resin such as polyethylene is loosely, thru pipe 2 and rings 6 and 8 as shown.

Figure 2:
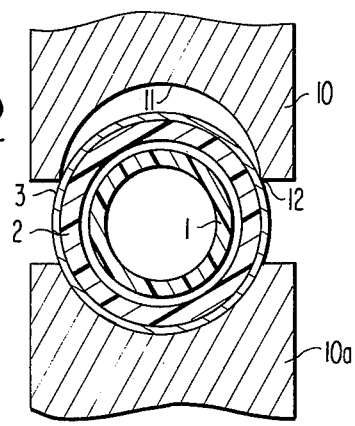
FIG. 2 is a sectional view seen in the direction of arrows A—A of the pipes in FIG. 1.

Such an assembly is placed between press jaws 10 and 10a of a pressing tool of two-divisional type shown in FIG. 2. The press jaws 10 and 10a are so designed that the surface 11 corresponding to the press ring 3 forms the diameter of the pipe 2 after the pressing operation has been completed. Curved surfaces 12 are provided on the four edge portions of the surface 11 to permit appropriate contraction without damaging the press ring 3.

Figure 3:
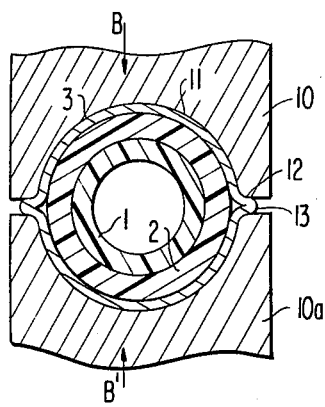
FIG. 3 is a sectional view similar to that of FIG. 2, but showing the state of the pipes after clamping.

When the press jaws 10 and 10a are together pressed as indicated by allows B, B' in FIG. 3, the press ring 3 is pressed and formed by the arcuate surface 12 and the forming surface 11. A part of the press ring 3 is squeezed out by the arcuate surfaces 12 to form bulged portions 13, whereby the compressed pipe 2 and the inner pipe 1 become clamped together through the press ring 3, and the clamped state will not be restored even when the press jaws 10, 10a are released.

Figure 4:
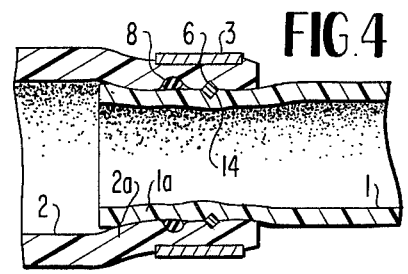
FIG. 4 is a longitudinal sectional view showing the state of the pipes after clamping according to the present invention.

After clamping, as shown in FIG. 4, pipes 1 and 2 are squeezed as shown by deformed parts 1a and 2a, respectively, and are closely stuck to each other. The leak-proof packing 8 held between the pipe 2 and the pipe 1 is pressed onto the outer surface of the pipe 1 thereby providing leak-proof seal. The intrusion ring 6 penetrates on the outer surface of the pipe 1a as shown at 14, thereby preventing the joined pipes from slipping apart.

Figure 5:
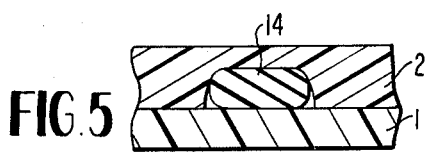
FIGS. 5 to 7 are parts of sections showing forms of packing used in the pipe fitting according to the embodiments of the present invention.
Figure 6:
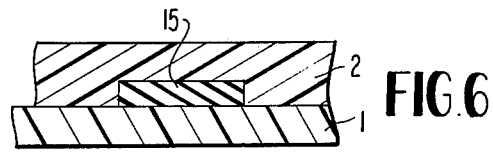

Pipes made of elastic material such as polyethylene or other plastic material are easily injured on their outer surfaces, so that it is important to provide a leak prevention means preventing such injuries. Particularly, there are longitudinal defects which are produced parallel to the pipe axis. In order to obtain a perfect leak-proof effect, it is preferable to use a packing 14 having an oval section, or a packing 15 in a form of a sheet, as shown in FIGS. 5 and 6, respectively. Each of the packings 14, 15 has a large contact length with the pipes.

Figure 7:
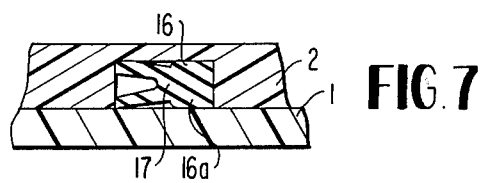

In the case where the internal fluid pressure of the pipe is high, a high leak-proof performance is also obtained by using a lip packing 17 provided with allowance for squeezing 16, as shown in FIG. 7.

The leak-proof effect may also be obtained by use of the elastic property of the pipe 2 itself without using leak-proof packings.

Figure 8:
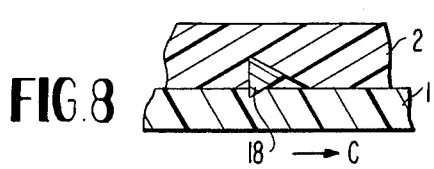
FIGS. 8 to 9 are parts of sections showing the instrusion rings used in the pipe fitting according to the embodiments of the present invention.
Figure 9:
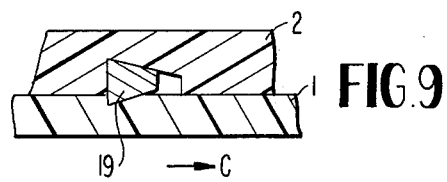

As for the intrusion ring 6, used for preventing slip out of the pipes, it is preferable that the ring has a triangular or trapezoidal cross section, as shown by 18 and 19 in FIGS. 8 and 9, respectively. Thus, by using intrusion rings 18, 19 having a triangular or trapezoidal cross section, and by causing the angular portion to intrude into the pipe 1, the slip out of the pipes can be prevented completely since the intrusion rings 18, 19 act to prevent the slip out, particularly if a drawing force is exerted on the pipe 1 in the direction C.

As explained above, the present invention provides a simple pipe fitting which develops the functions of preventing leakage and slip out at the joint portion of the pipes by compressing the press ring fitted externally of the elastic pipes, and which also presents a simple and positive joint by bulging out a portion of the press ring to maintain the shape.

What is claimed is:

1. A method of compression fitting telescoping elastic inner and outer synthetic resin pipes, said method comprising the steps of:

placing longitudinally spaced elastic packing and hard intrusion rings between telescoping portions of said pipes and partially within respective annular grooves on the periphery of one of said pipes, placing a press ring of initial diameter on the order of the outer diameter of said outer pipe on said outer pipe and overlying said packing and intrusion rings, uniformly compressing said press ring between multiple press jaws having a circular opening in contact with said press ring of a diameter less than the diameter of said press ring to deform said press ring and to elastically compress said pipes and to cause portions of said press ring between said press jaws to bulge out to form a tight leak prevention seal at said packing ring and to cause a portion of said intrusion ring to penetrate a part of the pipe opposite said groove to prevent longitudinal slippage between said compression fitted pipes 2. The method of claim 1, wherein said intrusion ring has a triangular cross section and is positioned in its groove such that a triangular corner of said intrusion ring penetrates into the opposing pipe.

3. The method of claim 1, wherein said intrusion ring has a trapezoidal cross section and is positioned in its groove such that one of the corners of said trapezoid penetrates into the opposing pipe.

4. The method of claim 1, wherein said packing ring is a lip packing having an allowance for squeezing.

5. The method of claim 1, wherein said packing ring has an elongated cross section with rounded edges.

6. The method of claim 1, wherein said packing ring is of flat sheet-like shape.

7. In combination telescoping inner and outer elastic synthetic resin pipes, said inner pipe having an outer diameter on the order of the inner diameter of said outer pipe and elastic packing and a hard intrusion ring partially received within respective annular grooves on the periphery of one of said pipes and between telescoping portions of said pipes, and a press ring of an initial diameter on the order of the outer diameter of said outer pipe positioned on said outer pipe overlying said packing and intrusion rings and uniformly compressed to a diameter less than its original diameter with bulged out opposed portions at circumferentially spaced positions such that said synthetic resin pipes are elastically compressed with the packing ring compressed within its annular groove and forming a leak tight seal between said elastic synthetic resin pipes and said intrusion ring including a portion penetrating the part of said pipe opposite that carrying said groove within which said intrusion ring is partially received such that longitudinal slippage between the press fitted pipes is prevented.

8. The combination of claim 7 wherein said intrusion has a triangular cross section.

9. The combination of claim 7 wherein said intrusion ring has a trapezoidal cross section.

* * * * *